Dec. 16, 1947.  G. A. LYON  2,432,531
WHEEL COVER
Filed May 12, 1945

Inventor
GEORGE ALBERT LYON
by The Firm of Charles W. Hills, Attys.

Patented Dec. 16, 1947

2,432,531

UNITED STATES PATENT OFFICE 2,432,531

WHEEL COVER

George Albert Lyon, Allenhurst, N. J.

Application May 12, 1945, Serial No. 593,479

5 Claims. (Cl. 301—37)

This invention relates to a wheel structure and more particularly to a novel wheel cover assembly therefor.

An object of this invention is to provide an improved form of means for tightly retaining a wheel cover over the outer side of an automobile wheel.

Another object of this invention is to provide means cooperable with the usual bolt-on cap screws of a wheel to clamp under tension a wheel cover on the outer side of the wheel.

Still another object of this invention is to provide a wheel cover adapted to be clamped to the wheel and which has an intermediate diaphragm-like portion which will yield when the cover is drawn tightly against the wheel by the clamping means.

In accordance with the general features of this invention there is provided a cover structure for a wheel including a tire rim and a body part having a central flange with bolt-on means, a wheel cover of sheet metal for the wheel including an outer annular portion for disposition over the exposed outer side flanges of the rim, and a radially inner portion extending in close proximity to the bolt on means and attachment ring means engaged by said bolt on means and overlapping the inner edge of said inner cover portion to clamp said cover under tension to the wheel.

A further feature of the invention relates to the provision in the foregoing cover of an intermediate diaphragm-like portion which will resiliently yield like a bellows when the inner portion of the cover is drawn towards the wheel by the bolt on means.

Another feature of the invention relates to the forming of the outer portion of the cover of such contour and extent that, in use, it will appear to constitute a continuation of the outer side wall of the tire thus giving the wheel the appearance of having a massive tire thereon.

Figure 1:
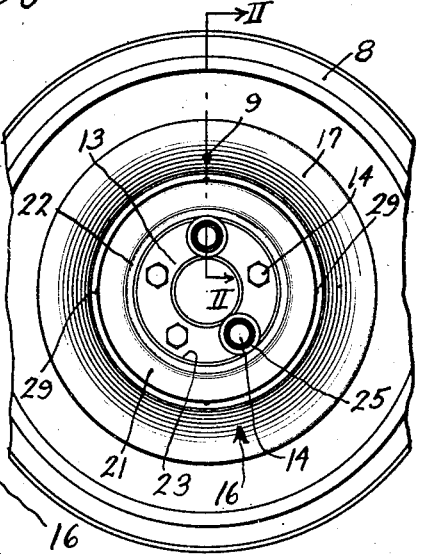

Other objects and features of this invention will more fully appear from the following detailed description taken in connection with the accompanying drawings which illustrate a single embodiment thereof and in which Figure 1 is a fragmentary outer side view of a cover embodying the features of this invention applied to a wheel, the hub cap being omitted.

Figure 2:
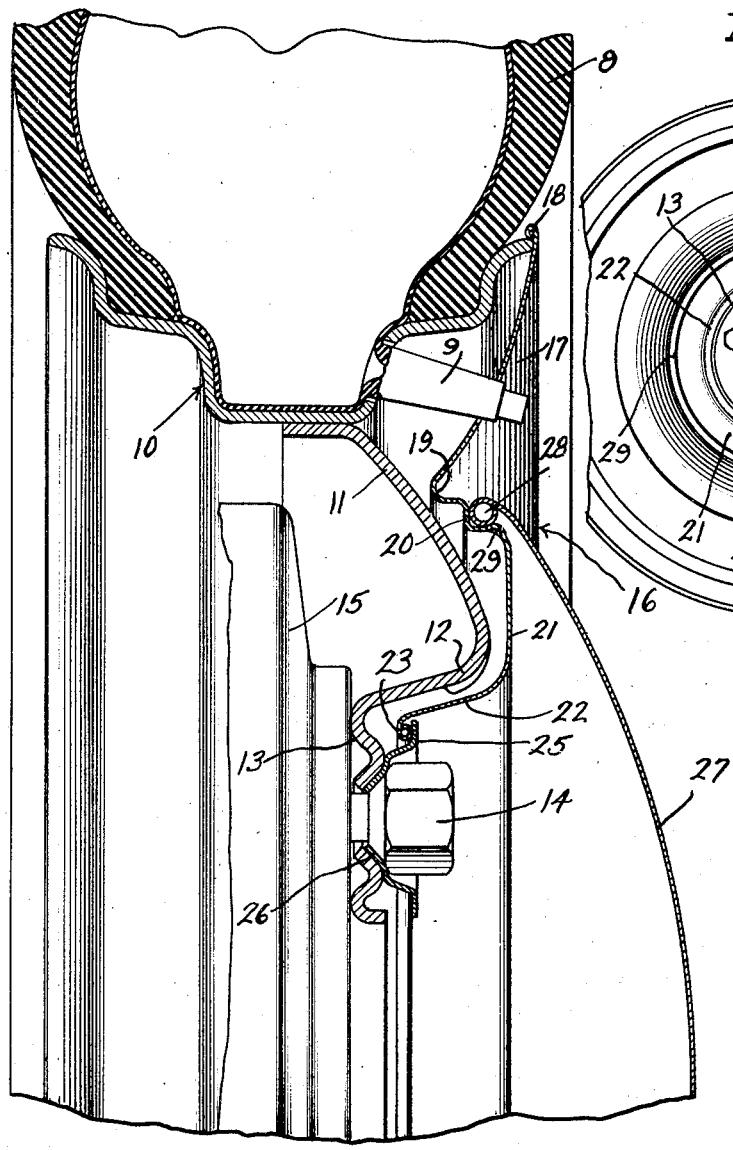

Figure 2 is an enlarged fragmentary cross sectional view taken on the line II—II of Figure 1 looking in the direction indicated by the arrows and showing the hub cap applied to the cover.

As shown on the drawings:

The reference character 8 designates generally a conventional pneumatic automobile tire and tube including the usual valve stem 9 projecting in the usual way through an aperture of one of the flanges of a multi flanged tire receiving rim 10. The rim 10 is of a conventional construction and is known in the trade as a drop center type of tire rim.

The tire rim is carried upon a load bearing or body part 11 which comprises a hollow stamping and includes a bulged central nose portion 12 terminating in a generally radially extending bolt on flange 13 which is apertured to accommodate the usual bolt on cap screws 14 threaded into the brake drum 15.

This type of wheel is now more or less conventional in the automotive trade and my invention is particularly concerned with providing a wheel cover for an outer side thereof which will readily accommodate manufacturing variations in the tire rim and body parts. For example, it is permissible to have a variation of as much as one-eighth of an inch in the relative locations of the outer surfaces of the tire rim and body part. That is to say, these parts may be displaced axially relative to each other as much as one-eighth of an inch from the specified requirements without the wheel necessarily being objectionable.

The cover of my invention is designated generally by the reference character 16 and preferably comprises a sheet metal stamping.

It includes an outer annular portion 17 extending generally axially and radially rearwardly from the outer turned edge 18 to an annular shoulder 19 which comprises a stiffening for the cover. The outer portion 17 is of such cross section and is so located with reference to the outer side of the tire that, in use, it appears to constitute a continuation of the outer side wall of the tire. This appearance can be enhanced by providing the portion 17 with a white external finish in which event it will, in use, appear to constitute a white side wall part of the tire. It will also be noted that this effect is considerably augmented by having the turned outer edge 18 of the portion 17 overhang the outer edge of the tire rim in close proximity to the outer side wall of the tire.

The turned shouldered margin 19 of portion 17 terminates in an axially offset annular shoulder 20 which in turn terminates in an offset annular intermediate portion 21 which is substantially flattened as will be seen from Figure 2. This flattened intermediate portion 21 is a very important feature of the cover since it provides the cover with the requisite resiliency to enable the cover to have an adjustable fit with the wheel. In reality in action this flattened portion 21 may be likened to a flexible diaphragm or bellows.

The portion 21 in turn terminates radially inwardly in an inclined central portion 22 which telescopes the body part of the wheel and terminates in a turned edge or flange 23 located substantially parallel to and directly opposite the bolt on flange 13 of the wheel body part.

In order to retain or clamp this cover to the wheel there is provided one or more rings or washers 25, each of which is apertured at its center to receive the shank of a cap screw 14 and also includes an inclined portion 26 adapted to be engaged by the undersurface of the head of the cap screw 14.

Now it will be clear that when the cover is on the wheel, a ring or washer 25 is disposed about the shank of a cap screw and the cap screw is then threaded into the brake drum 15. As the head of the screw 14 contacts the inclined portion 26 of the ring or washer, the outer portion of the washer engages the turned inner edge of the cover and draws the cover towards the wheel so that the outer edge 18 of the cover is brought into tight engagement with the edge of the tire rim. During the course of this action, the inner turned margin of flange 23 of the cover is enabled to move axially rearwardly by the yielding of the diaphragm-like portion 21. Thus the cover may be tightly clamped against the wheel under tension irrespective of the allowable manufacturing tolerances in the relative locations of the rim and body parts of the wheel.

It should be noted that while in Figure 2 I have illustrated the wheel assembly as being provided with two rings or washers 25 the invention is not to be thus limited since if it is so desired a lesser or greater number of these rings may be employed depending upon the size of the cover and the amount of engagement desired.

After the cover has been sprung into a tight clamped engagement with the wheel a hub cap 27 is placed over the diaphragm portion 21 of the cover and the outer turned edge 28 of the hub cap is cammed over protuberance means 29 formed in the outer margin of the diaphragm portion 21. The protuberance means may be in the form of a continuous rib or in the form of a plurality of protuberances such for example as three or four in number. The hub cap is held under tension by reason of the fact that its outer edge 28 is resiliently sprung over the high points of the protuberances and behind the protuberances until the turned edge is tightly seated against the annular seat portion 20 formed in the cover for accommodating the hub cap.

The turned edge 28 of the hub cap is easily accessible for the purpose of prying the hub cap off through the use of the usual pry off tool or screw driver.

I claim as my invention:

1. In a cover structure for a wheel including a tire rim and a body part having a central flange with bolt-on means, a wheel cover of sheet metal for said wheel including an outer annular portion for disposition over the exposed outer side flanges of the rim, an intermediate axially offset annular portion for disposition opposite the body part and a radially inner portion adapted to extend in close proximity to said bolt-on means, and a plurality of separate attachment rings adapted to be engaged by said bolt on means and to cooperate in overlapping relation with the inner edge of said inner cover portion to clamp said cover under tension to the wheel, the cover structure being engageable with the wheel radially outwardly of said inner portion in the initial assembly of the cover with the wheel.

2. In a cover structure for a wheel including a tire rim and a body part having a central flange with bolt-on means, a wheel cover of sheet metal for said wheel including an outer annular portion for disposition over the exposed outer side flanges of the rim and a radially inner portion adapted to extend in close proximity to said bolt on means and attachment rings engageable by said bolt-on means and constructed for overlapping the inner edge of said inner cover portion to clamp said cover under tension to the wheel, the cover structure being engageable with the wheel radially outwardly of said inner portion in the initial assembly of the cover with the wheel.

3. In a cover structure for a wheel including a tire rim and a body part having a central flange with bolt-on means, a wheel cover of sheet metal for said wheel including an outer annular portion for disposition over the exposed outer side flanges of the rim and a radially inner portion disposed to extend in close proximity to said bolt-on means, and an attachment ring to be engaged by said bolt-on means and to be located for overlapping the inner edge of said inner cover portion to clamp said cover under tension to the wheel, the cover structure being engageable with the wheel radially outwardly of said inner portion in the initial assembly of the cover with the wheel, said attachment ring having an inclined axially rearward portion engageable under the bolt-on means and with the central flange of the wheel, the portion of the ring which overlaps and clamps the inner cover portion being substantially offset axially outwardly relative to said inclined portion so that the inner cover portion is maintained in spaced relation to the central flange of the wheel.

4. In a wheel structure including tire rim and body parts, said body part having a central bolt-on flange, a wheel cover including an outer annular portion for disposition over the exposed outer side of the tire rim, an intermediate diaphragm portion located opposite the body part and a radially inner portion extending into close proximity to said bolt-on flange, a plurality of attachment ring washers in engagement with the inner edge of the inner cover portion, and bolt-on means for securing said ring washer means to the bolt-on flange and thereby clamping said inner cover portion and thus the cover under tension to the wheel, the outer portion of the cover being in engagement with the wheel and being constructed and arranged to enter into such engagement in the initial assembly of the cover with the wheel ahead of the clamping of the cover in place by said ring washer means.

5. A wheel structure including tire rim and body parts, the body part having a central attachment flange, a wheel cover including an outer portion in engagement with the tire rim, an inner portion adapted to lie in close proximity to said attachment flange, and an intermediate flexible diaphragm portion normally out of engagement with the wheel and tending to draw the inner portion away from the wheel, a plurality of ring washer means engaging the inner edge of the inner portion, and means engageable with said attachment flange and securing said ring washer means in place and maintaining the inner portion of the cover closer to the wheel body part than its normal undeflected position under the influence of said diaphragm portion but in fully spaced relation to the body part, whereby the cover is held to the wheel under tension.

GEORGE ALBERT LYON.

REFERENCES CITED

The following references are of record in the file of this patent:

UNITED STATES PATENTS

| Number | Name | Date |
| --- | --- | --- |
| 2,197,608 | Burger | Apr. 16, 1940 |

FOREIGN PATENTS

| Number | Country | Date |
| --- | --- | --- |
| 263,882 | Great Britain | Apr. 21, 1927 |